United States Patent Office 3,306,955
Patented Feb. 28, 1967

3,306,955
BACTERIOSTATIC ACRYLONITRILE POLYMERS
Fred J. Lowes, Jr., Midland, Mich., assignor to The Dow Chemical Company, Midland, Mich., a corporation of Delaware
No Drawing. Filed Mar. 26, 1962, Ser. No. 182,622
9 Claims. (Cl. 260—895)

This invention relates to bacteriostatic compositions of polyacrylonitrile or of copolymers containing at least 85 weight percent of acrylonitrile in the polymer molecule and to articles made from such compositions.

Polyacrylonitrile and many of the fiber and film-forming copolymers of acrylonitrile may advantageously be fabricated by a wet spinning process wherein the polymer composition is extruded from compositions of the polymer in polyacrylonitrile-dissolving aqueous saline solvents, particularly aqueous solutions of zinc chloride and its saline equivalents. Such a procedure, as is well known in the art, is oftentimes referred to as salt-spinning with the fibers (or other shaped articles) obtained thereby being salt-spun. In salt-spinning, the fiber-forming aqueous saline spinning solution or other composition of the polymer is extruded during the spinning operation into a non-polymer dissolving coagulation liquid or spin bath; which frequently is a solution of the same salt or salts as are in the spinning solution.

Acrylonitrile polymers (including fiber-forming copolymers), particularly polyacrylonitrile, that are salt-spun in the referred-to manner are generally formed initially as aquagel intermediates. Such intermediates have a water-swollen or hydrated structure prior to their being finally irreversibly dried to the desired, characteristically hydrophobic product.

Advantageously, the aquagel structure of polyacrylonitrile and other fiber and film-forming acrylonitrile polymers may be derived by the extrusion of a solution of the acrylonitrile polymer that is dissolved in an aqueous zinc chloride saline solvent into and coagulation in an aqueous coagulating spin bath. It is usually desirable for zinc chloride to be at least the principal (if not the entire) saline solute in the aqueous solvent solution.

If preferred, however, various of the saline equivalents for zinc chloride may also be employed in the aqueous saline solvent medium for the spinning solution and the coagulating bath utilized. These zinc chloride equivalents, as is well known, include various of the thiocyanates (such as calcium thiocyanate), lithium bromide and the salts and salt mixtures that are "solvent" members of the so-called "lyotropic" series as are disclosed, among other places, in U.S. 2,140,921; 2,425,192; 2,648,592; 2,648,593; 2,648,646; 2,648,648; and 2,648,649.

It has been proposed, also, to blend such materials as polyvinylpyrrolidone with polyacrylonitrile, and to dissolve and spin the mixture. It has also been proposed that readily dyeable oriented products may be made from high acrylonitrile polymers by incorporating in the spun article during the course of its manufacture and before it is dried and reduced to its final dimensions, compounds such as polyvinylpyrrolidone, and subsequently freeing the article from the solvent medium while leaving the polyvinylpyrrolidone in the dried product.

Fibers produced from acrylonitrile polymers have excellent physical properties but do not have the inherent ability to inhibit the growth of bacteria. The textile industry is particularly interested in a fibrous material useful for the production of blankets, carpeting and the like, which has the desirable properties of polyacrylonitrile or fiber-forming copolymers containing at least 85 weight percent of acrylonitrile in the polymer molecule and, in addition, has the ability to inhibit the growth of bacteria and to destroy existing bacteria. It is also highly desirable to prepare heat-shrinkable, flexible films useful for bottle closures and the like applications which have long-lasting bacteriostatic properties.

Fabricated acrylonitrile polymer films, textile fibers and the like filamentary articles derived from salt-spinning processes are generically described as being capable of lying substantially in a single plane, having at least one major dimension, and at least one minor dimension less than about 0.1 inch, said articles being characterized by having orientation of the molecules parallel to one another and to a major axis of the article.

The foregoing statement of the problem has referred to fibers and films, and the invention will be illustrated with respect to fibers. The problem is more general, however, and applies to the defined compositions in the forms of sheets, tubes, rods and molded articles as well as films, fibers and other filaments.

It is the primary object of this invention to provide compositions of matter containing at least 85 weight percent of acrylonitrile in the polymer molecule which have long-lasting bacteriostatic properties.

A further object is to provide shaped articles from the composition of the invention which have long-lasting bacteriostatic properties.

Other and related objects will become evident from the following specification and claims.

These objects are realized, according to the invention, by forming a composition, the essential constituents of which are a fiber-forming acrylonitrile polymer as defined herein, having dispersed therein; (1) at least about one weight percent based on the weight of said fiber-forming polymer of polyvinylpyrrolidone; and (2) at least about 0.5 weight percent, preferably about 0.5 to 20 weight percent based on the weight of the fiber-forming polymer of the bacteriostatic agent, dibutyl 2,4,6-trichlorophenoxytin hydroxide.

The invention is applicable to products which are made by dry-spinning or wet-spinning from organic solutions of the polymer or the polymeric compositions of the present invention, but finds especial advantage when applied to products which are made by wet-spinning of aqueous saline solutions of the polymer or of the compositions defined herein.

Articles made from the compositions of the present invention show pronounced bacteriostatic properties even after prolonged treatment with a heated aqueous detergent system.

The acrylonitrile polymer employed in practice of the present invention is advantageously, polyacrylonitrile, although, as is readily apparent, any of the well-known fiber and film-forming copolymers thereof that contain, polymerized in the polymer molecule, at least 85 weight percent of acrylonitrile with at least one other ethylenically unsaturated monomer that is copolymerizable with acrylonitrile may, beneficially, be utilized. The acrylonitrile polymer employed is soluble in an aqueous saline solvent which, usually, has therein at least about 50–60 weight percent of zinc chloride or its saline equivalents. U.S. 2,776,946, among many other reference sources, set forth many of the monomers which may be copolymerized or interpolymerized with acrylonitrile to produce binary or ternary acrylonitrile copolymers that are useful in the practice of the invention.

Polyvinylpyrrolidone and similar functional polymeric materials are readily available and are well known to those skilled in the art.

It is known that polyvinylpyrrolidone is soluble not only in the organic spinning media for the fiber-forming polymers here concerned, but is also soluble in aqueous media, and in the presence of both the polymer and water, is preferentially absorbed by the polymer.

The polyvinylpyrrolidone may be used at full strength or in aqueous solution which may be of any desired or convenient concentration. Thus, solutions containing as little as 0.1 percent by weight of the polyvinylpyrrolidone have been used successfully. The time and temperature of treatment, and concentration of the treating liquid should be so correlated as to cause the fibers to absorb at least one weight percent of polyvinylpyrrolidone based on the weight of the fiber-forming polymer. Amounts of 5 to 15 weight percent are preferred, but amounts as high as 20 percent are unobjectionable. The temperature of treatment may be any temperature at which the aquagel fibers exist and at which the polyvinylpyrrolidone or its solution is liquid. It is convenient to effect the treatment at room temperature or at temperatures up to about 100° C., but temperatures of 10° C. or lower may be used if desired.

It has been found that for the purposes of the present invention, the prescribed amounts of polyvinylpyrrolidone, as defined herein, may be incorporated into the fiber-forming acrylonitrile polymers defined herein in any known manner. Thus, polyvinylpyrrolidone may be blended with the acrylonitrile polymers or monomeric mixtures of acrylonitrile or mixtures of acrylonitrile, and another monoethylenically unsaturated monomer, as defined herein, prior to polymerization of said monomers and/or spinning of said polymeric compositions into fibers or like structures.

The bacteriostatic agent useful for the present invention is prepared by reacting dibutyltin oxide with 2,4,6-trichlorophenol. Both of these compounds are articles of commerce. Conveniently, reaction is carried out by combining the said starting materials in an inert liquid reaction medium. The starting materials are consumed in equimolecular amounts, and may be supplied in such amounts to the reaction. Dichloromethane is a suitable reaction solvent, and the reflux temperature (40°–42° C.) of a boiling reaction mixture in methylene chloride as solvent is a satisfactory reaction temperature. At this temperature, refluxing for approximately two hours obtains the desired compound in good yield. The product may be purified by simply vaporizing and thus removing liquid reaction medium. The resulting product may at first occur as a viscous oil; upon standing, at room temperature, it tends to crystallize and form a solid melting at 94°–97° C.

It has been found that the bacteriostatic agent of the present invention is sufficiently soluble in water for the purposes of the present invention and is also soluble in organic spinning media for the acrylonitrile polymers defined herein, and in the presence of both the polymer and water is preferentially absorbed by the polymer.

The time required for the water-swollen or finally-shaped irreversibly dried fiber to absorb the bacteriostatic agent of the present invention varies with the concentration of the liquid from which the bacteriostatic agent is applied, and the temperature of application. In some instances, enough of the bacteriostatic agent is absorbed by the polymeric article in about 5 minutes. No adverse effect is found when the polymeric article is soaked in the bacteriostatic agent solution for several days.

The bacteriostatic agent defined herein may be used at full strength or in aqueous solution which may be of any desired or convenient concentration. Thus, solutions containing as little as 0.1 percent or less by weight of the bacteriostatic agent have been used successfully. The time and temperature of treatment and concentration of the treating liquid described herein should be so correlated as to cause the fibers to absorb at least about 0.5 weight percent of the bacteriostatic agent based on the weight of the fiber-forming polymer. Amounts as high as 20 weight percent are unobjectionable. The temperature of treatment may be any temperature at which the aqueous bacteriostatic solution is a liquid, however, it is convenient to effect the treatment at temperatures of about 95° C.

The bacteriostatic agent can be added to the acrylonitrile polymer spinning solution in a mutual solvent therefore, or by milling said bacteriostatic agent to finely divided particles which are suspended in a small amount of the spinning solution media to form a concentrate thereof, followed by addition of the concentrate to the spinning solution with stirring.

According to a preferred embodiment of the present invention, a fiber-forming polymer containing at least 85 percent acrylonitrile in the polymer molecule is spun from an aqueous saline solution thereof into an aqueous coagulant, and the coagulated product is stretched to effect orientation and is washed in any conventional manner to extract saline constituents. Either before or after the initial coagulation, and while the product is still an aquagel, i.e., before it has been dried irreversibly, and preferably after most of the inorganic salt has been removed, polyvinylpyrrolidone is applied to and absorbed by the aquagel product in amount to represent at least one weight percent of the fiber-forming polymer.

Addition of the bacteriostatic agent defined herein may be accomplished either before or after the incorporation of the polyvinylpyrrolidone in said polymeric article, or to the finally-shaped, irreversibly dried polymeric article. It is preferred however to add the bacteriostatic agent following the addition of the polyvinylpyrrolidone.

It will be appreciated by those skilled in the art that various other additives and finishing agents commonly employed in the fiber and filament arts can be added to the composition of the present invention. Such materials include typically, for example, plasticizers, lubricants, dye assistants, dyes and pigments.

The following example, wherein all parts and percentages are to be taken by weight, illustrates the present invention but is not to be construed as limiting its scope.

*Example 1*

A length (4 inches) of water-swollen, unstretched tow, formed by extrusion of an aqueous saline solution of polyacrylonitrile through a 10 mil, 300 hole metal spinneret into an aqueous coagulating bath, was washed thoroughly to remove salt. It was then allowed to stand in 500 mls. of 0.4 percent solution of polyvinylpyrrolidone until the fibers had absorbed at least one percent of the polyvinylpyrrolidone. The tow was removed from the impregnating solution, and stretched to about 10 times its original length in moist steam.

The dried tow was immersed in 10 mls. of a 0.1 percent aqueous solution of dibutyl 2,4,6-trichlorophenoxytin hydroxide at 95° C. for a period of about 10 minutes, until the fibers had absorbed at least 0.5 weight percent of the dibutyl 2,4,6-trichlorophenoxytin hydroxide based on the weight of the fiber-forming polymer. The tow was removed from the impregnating solution, rinsed briefly in tap water and dried over night under normal room temperatures.

The dried, impregnated tow was immersed in an aqueous bath containing 0.1 weight percent of Igepon T (sodium N-methyl-N-oleyl taurate) and heated with stirring at 95° C. for a period of about 0.5 hour. The tow was then rinsed with tap water and dried overnight at normal room temperatures.

The dried filament tow was placed on the surface of a nutrient agar seeded with Staphylococcus aureus contained on the surface of a hardened agar media plate, and subsequently incubated for a period of about 48 hours at a temperature between about 30° C. and 37° C. A zone of inhibition was observed around the test specimen following the incubation period.

Similar good results are obtained using any concentration between about 0.5 weight percent to 20 weight percent based on the weight of the fiber-forming polymer of dibutyl 2,4,6-trichlorophenoxytin hydroxide.

Additionally, similar good results are obtained when the prescribed amounts of dibutyl 2,4,6-trichlorophenoxytin hydroxide are incorporated in a finally-shaped irreversibly dried fiber from an aqueous solution as described herein.

It has also been found that similar good results are obtained when the prescribed amounts of dibutyl 2,4,6-trichlorophenoxytin hydroxide are added directly to the aqueous polymeric saline spinning solution prior to formation of the finally-shaped article subsequently produced therefrom.

Similar good results are also obtained when fiber and film-forming acrylonitrile polymers containing at least 85 weight percent of polymerized acrylonitrile and up to 15 weight percent of one or more of such copolymerizable materials as vinyl chloride, vinyl acetate, methyl and other alkyl acrylates or methacrylates, the vinyl pyridines, allyl alcohol and many others well known to those skilled in the art are admixed with the prescribed amounts of the dibutyl 2,4,6-trichlorophenoxytin hydroxide described herein.

In contrast to the good results described herein, it has been found that fibers produced from the compositions of the type described by the present invention but which contain less than about one weight percent of polyvinylpyrrolidone do not provide inhibition to Staphylococcus aureus when said articles are tested as described in Example 1.

What is claimed is:

1. Composition of matter, the essential constituents of which are a fiber-forming acrylonitrile polymer which contains in the polymer molecule at least about 85 weight percent of acrylonitrile, the balance being another monoethylenically unsaturated monomeric material that is copolymerizable with acrylonitrile, having dispersed therein; (1) at least about 1 weight percent based on the weight of said fiber-forming polymer of polyvinylpyrrolidone; and (2) at least about 0.5 weight percent based on the weight of said fiber-forming polymer of dibutyl 2,4,6-trichlorophenoxytin hydroxide.

2. The composition of claim 1, wherein the dibutyl 2,4,6-trichlorophenoxytin hydroxide is present in amounts between about 0.5 and 20 weight percent based on the weight of said fiber-forming polymer.

3. The composition of claim 1, wherein the polyvinylpyrrolidone is present in amounts between about 1 and 20 weight percent based on the weight of said fiber-forming polymer.

4. The composition of claim 1, wherein said fiber-forming polymer is polyacrylonitrile.

5. A polymeric article of manufacture having bacteriostatic properties, said article capable of lying substantially in a single plane, having at least one major dimension, and at least one minor dimension less than about 0.1 inch, comprised of a fiber-forming acrylonitrile polymer which contains in the polymer molecule at least about 85 weight percent acrylonitrile, the balance being another monoethylenically unsaturated monomeric material that is copolymerizable with acrylonitrile, having dispersed therein (1) at least about 1 weight percent based on the weight of the fiber-forming polymer of polyvinylpyrrolidone; and (2) dispersed therein at least about 0.5 weight percent based on the weight of said fiber-forming polymer of dibutyl 2,4,6-trichlorophenoxytin hydroxide.

6. The article of claim 5, wherein the dibtuyl 2,4,6-trichlorophenoxytin hydroxide is present in amounts between about 0.5 and 20 weight percent based on the weight of said fiber-forming polymer.

7. The article of claim 5, wherein the polyvinylpyrrolidone is present in amounts between about 1 and 20 weight percent based on the weight of said fiber-forming polymer.

8. The article of claim 5, wherein said fiber-forming polymer is polyacrylonitrile.

9. The article of claim 5, wherein said article is filamentary structure having bacteriostatic properties.

References Cited by the Examiner

UNITED STATES PATENTS

| | | | |
|---|---|---|---|
| 2,790,783 | 4/1957 | Coover | 260—895 |
| 2,989,360 | 6/1961 | Mautner | 8—55 |
| 2,991,183 | 7/1961 | Lederer et al. | 167—30 |
| 3,058,881 | 10/1962 | Wilde | 167—30 |
| 3,099,668 | 7/1963 | Zweigle et al. | 167—30 |
| 3,198,764 | 8/1965 | Lowes | 260—45.95 |

MURRAY TILLMAN, *Primary Examiner.*

JAMES A. SEIDLECK, *Examiner.*

N. W. SHUST, J. L. WHITE, *Assistant Examiners.*